US009652402B2

(12) United States Patent
Venkatasubramanian et al.

(10) Patent No.: US 9,652,402 B2
(45) Date of Patent: May 16, 2017

(54) HIDING PAGE TRANSLATION MISS LATENCY IN PROGRAM MEMORY CONTROLLER BY NEXT PAGE PREFETCH ON CROSSING PAGE BOUNDARY

(71) Applicant: Texas Instruments Incorporated, Dallas, TX (US)

(72) Inventors: Ramakrishnan Venkatasubramanian, Plano, TX (US); Oluleye Olorode, Garland, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 102 days.

(21) Appl. No.: 14/581,487

(22) Filed: Dec. 23, 2014

(65) Prior Publication Data

US 2016/0179699 A1    Jun. 23, 2016

(51) Int. Cl.
    *G06F 12/10*    (2016.01)
    *G06F 12/1027*  (2016.01)
    *G06F 12/1009*  (2016.01)

(52) U.S. Cl.
    CPC ...... *G06F 12/1027* (2013.01); *G06F 12/1009* (2013.01); *G06F 2212/1024* (2013.01); *G06F 2212/681* (2013.01); *G06F 2212/684* (2013.01)

(58) Field of Classification Search
    None
    See application file for complete search history.

(56) References Cited

U.S. PATENT DOCUMENTS

| 5,479,628 | A  | * | 12/1995 | Olson      | G06F 12/10    |
|           |    |   |         |            | 711/163       |
| 5,606,683 | A  | * |  2/1997 | Riordan    | G06F 12/1027  |
|           |    |   |         |            | 711/203       |
| 6,442,667 | B1 | * |  8/2002 | Shiell     | G06F 12/0893  |
|           |    |   |         |            | 365/230.03    |
| 7,734,895 | B1 | * |  6/2010 | Agarwal    | G06F 8/52     |
|           |    |   |         |            | 712/13        |
| 2002/0065993 | A1 | * | 5/2002 | Chauvel   | G06F 1/206    |
|           |    |   |         |            | 711/144       |
| 2002/0069327 | A1 | * | 6/2002 | Chauvel   | G06F 1/206    |
|           |    |   |         |            | 711/130       |
| 2003/0126371 | A1 | * | 7/2003 | Venkatraman | G06F 9/3842 |
|           |    |   |         |            | 711/137       |
| 2004/0148480 | A1 | * | 7/2004 | Watt      | G06F 9/4812   |
|           |    |   |         |            | 711/163       |
| 2005/0198466 | A1 | * | 9/2005 | Estlick   | G06F 12/1027  |
|           |    |   |         |            | 711/207       |
| 2006/0248279 | A1 | * |11/2006 | Al-Sukhni | G06F 12/0862  |
|           |    |   |         |            | 711/137       |

(Continued)

*Primary Examiner* — Mano Padmanabhan
*Assistant Examiner* — Jean Edouard
(74) *Attorney, Agent, or Firm* — Robert D. Marshall, Jr.; Charles A. Brill; Frank D. Cimino

(57) ABSTRACT

This invention hides the page miss translation latency for program fetches. In this invention whenever an access is requested by CPU that crosses a memory page boundary, the L1I cache controller request a next page translation along with the current page. This pipelines requests to the μTLB without waiting for L1I cache controller to begin processing the next page requests. This becomes a deterministic prefetch of the second page translation request. The translation information for the second page is stored locally in L1I cache controller and used when the access crosses the next page boundary.

12 Claims, 9 Drawing Sheets

(56) References Cited

U.S. PATENT DOCUMENTS

| | | | |
|---|---|---|---|
| 2007/0150659 A1* | 6/2007 | Arimilli | G06F 9/30032 711/137 |
| 2009/0106523 A1* | 4/2009 | Steiss | G06F 12/1036 711/205 |
| 2010/0174842 A1* | 7/2010 | Kimelman | G06F 11/073 710/267 |
| 2011/0219208 A1* | 9/2011 | Asaad | G06F 15/76 712/12 |
| 2012/0005454 A1* | 1/2012 | Waugh | G06F 12/1027 711/207 |
| 2012/0011342 A1* | 1/2012 | Ingle | G06F 12/1027 711/207 |
| 2012/0102258 A1* | 4/2012 | Hepkin | G06F 9/45558 711/6 |
| 2014/0156930 A1* | 6/2014 | Isloorkar | G06F 12/0811 711/122 |
| 2015/0143072 A1* | 5/2015 | Sibert | G06F 12/1036 711/206 |
| 2015/0149743 A1* | 5/2015 | Lu | G06F 12/1027 711/207 |

* cited by examiner

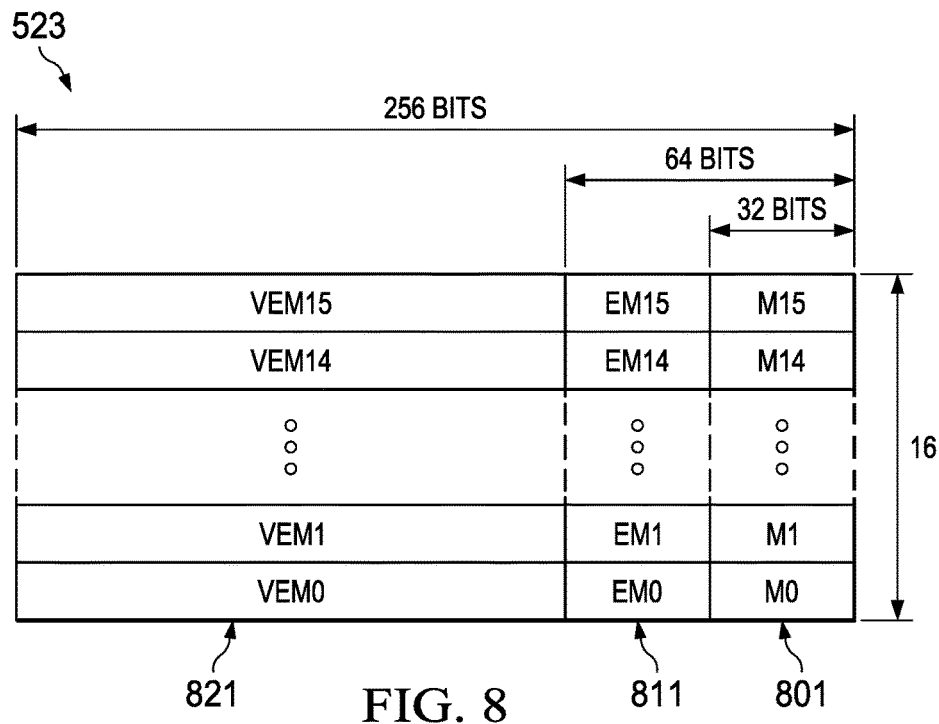
FIG. 8
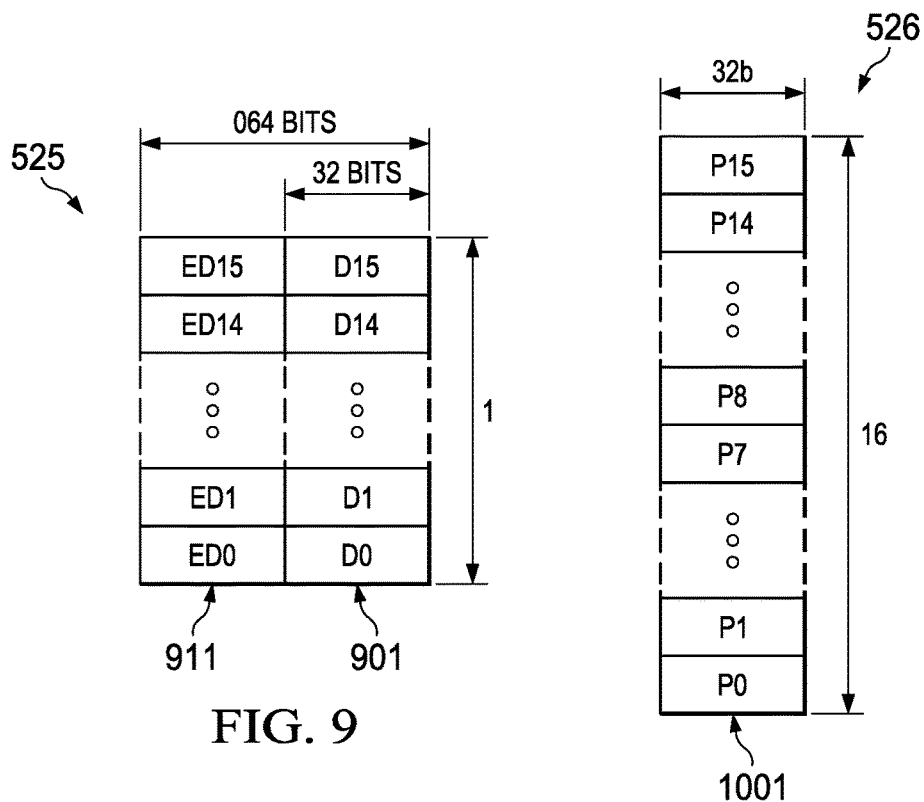
FIG. 9
FIG. 10

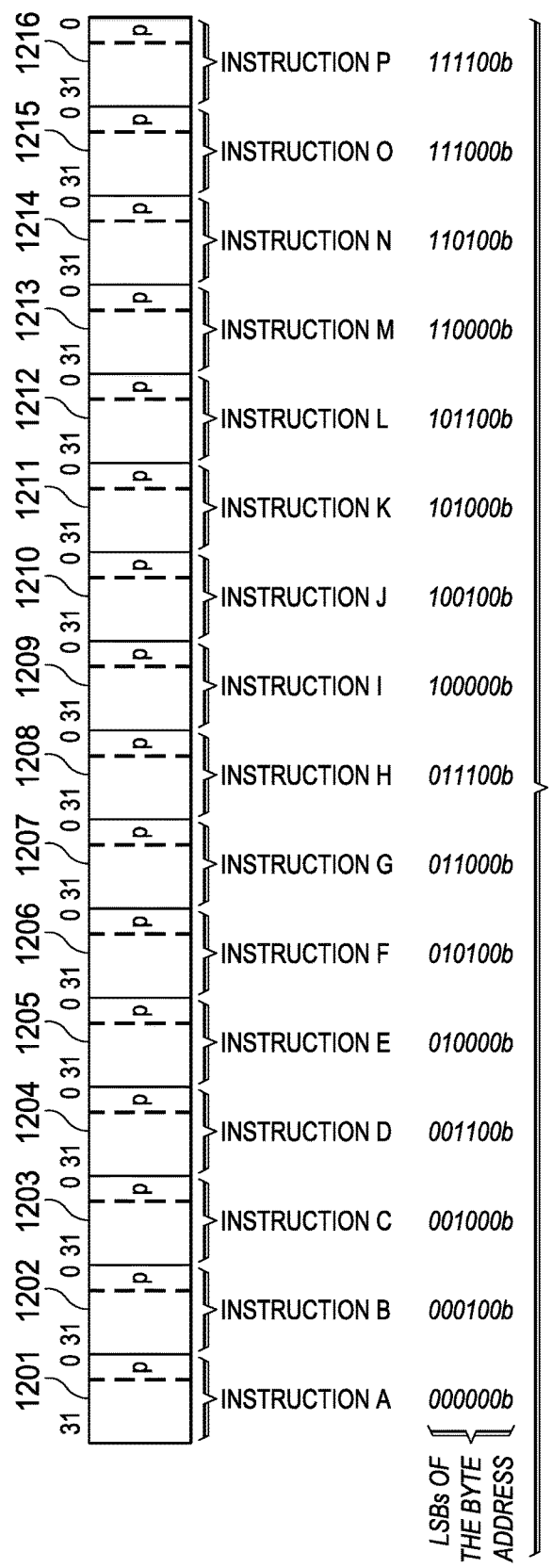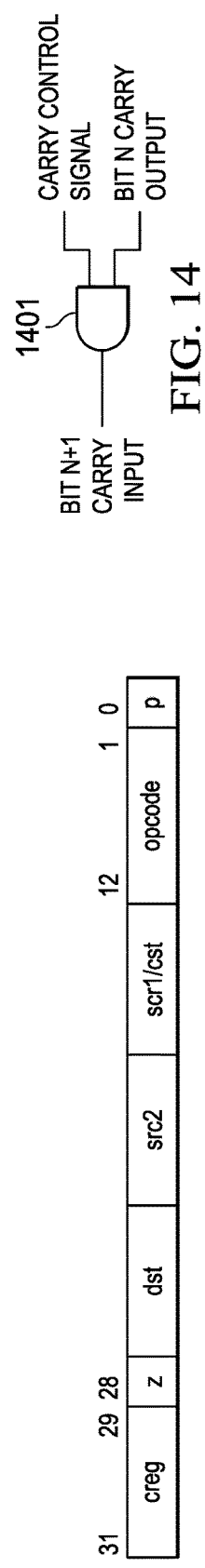
FIG. 12
FIG. 13
FIG. 14

HIDING PAGE TRANSLATION MISS LATENCY IN PROGRAM MEMORY CONTROLLER BY NEXT PAGE PREFETCH ON CROSSING PAGE BOUNDARY

TECHNICAL FIELD OF THE INVENTION

The technical field of this invention is digital data processing and more specifically address translation.

BACKGROUND OF THE INVENTION

In a processor supporting virtual memory, the virtual address provided by the CPU has to be translated to a physical address. This is typically accomplished by a Memory management unit (MMU). The MMU typically uses a µTLB (micro-translation look-aside buffer) as a cache of the address translation entries stored in the MMU. Such address translation entries are typically organized based upon memory pages. Every virtual address requested by CPU needs to be translated to the physical address by the µTLB/MMU for memory access. This is typically performed on page boundaries. If the series of program fetches cross a boundary into the next page, then the next address translation entry is needed for virtual to physical address translation. If this next address translation entry is not in the µTLB, it must be requested from the MMU. This translation data fetch may take tens to hundreds of cycles depending on the page translation and page table walk latency in the MMU.

SUMMARY OF THE INVENTION

This invention hides the page miss translation latency for program fetches. In this invention whenever an access is requested by CPU that crosses a memory page boundary, the L1I cache controller request a next page translation along with the current page. This pipelines requests to the µTLB without waiting for L1I cache controller to begin processing the next page requests. This becomes a deterministic prefetch of the second page translation request. The translation information for the second page is stored locally in L1I cache controller and used when the access crosses the next page boundary.

In this invention the digital signal processor (DSP), a program cache memory controller (L1I controller), and a CPU to L1I cache interface provides the virtual address of fetch packets. Any L1I cache miss request (virtual address) going out to L2 cache has to be translated to the physical address and requested to L2 cache.

The L1I cache controller also determines if the last fetch indexes to a next memory page in the translation table. If this occurs, the L1I cache controller requests the next page translation table entry before it is needed. Typically the new page translation table entry will be complete or in progress when the program fetch address crosses into the next page. This reduces the latency for fetching the instructions in the next page.

BRIEF DESCRIPTION OF THE DRAWINGS

These and other aspects of this invention are illustrated in the drawings, in which:

FIG. 8 illustrates the local vector register file shared by the multiply and correlation functional units;

FIG. 9 illustrates local register file of the load/store unit;

FIG. 10 illustrates the predicate register file;

FIG. 12 illustrates sixteen instructions of a single fetch packet;

FIG. 13 illustrates an example of the instruction coding of instructions used by this invention;

FIG. 14 illustrates the carry control for SIMD operations according to this invention;

DETAILED DESCRIPTION OF PREFERRED EMBODIMENTS

Figure 1:
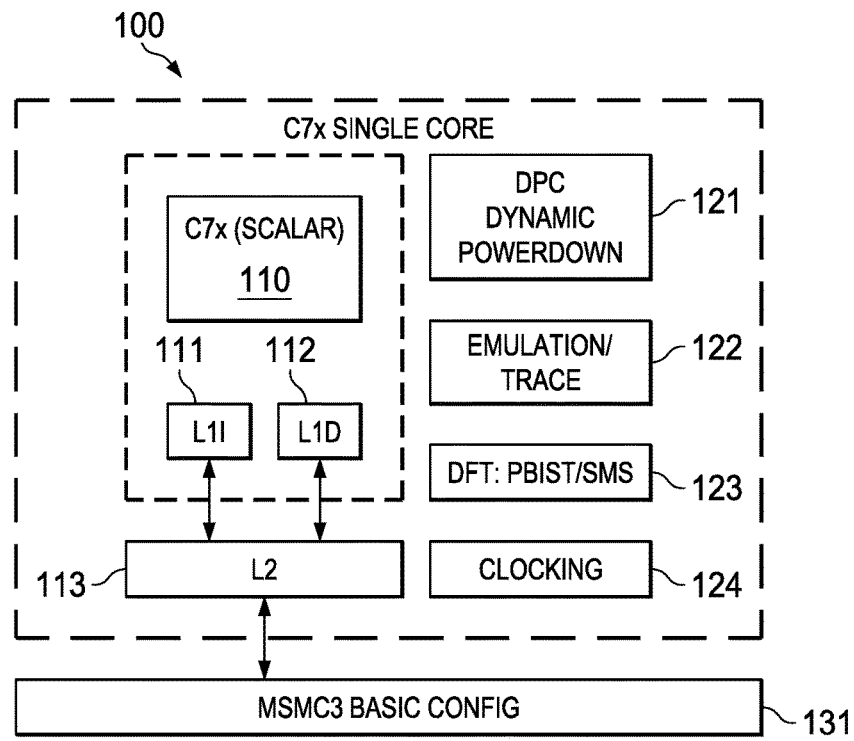
FIG. 1 illustrates a single core scalar processor according to one embodiment of this invention.

FIG. 1 illustrates a single core scalar processor according to one embodiment of this invention. Single core processor 100 includes a scalar central processing unit (CPU) 110 coupled to separate level one instruction cache (L1I) 111 and level one data cache (L1D) 112. Central processing unit core 110 could be constructed as known in the art and would typically include a register file, an integer arithmetic logic unit, an integer multiplier and program flow control units. Single core processor 100 includes a level two combined instruction/data cache (L2) 113 that holds both instructions and data. In the preferred embodiment scalar central processing unit (CPU) 110, level one instruction cache (L1I) 111, level one data cache (L1D) 112 and level two combined instruction/data cache (L2) 113 are formed on a single integrated circuit.

In a preferred embodiment this single integrated circuit also includes auxiliary circuits such as power control circuit 121, emulation/trace circuits 122, design for test (DST) programmable built-in self test (PBIST) circuit 123 and clocking circuit 124. External to CPU 110 and possibly integrated on single integrated circuit 100 is memory controller 131.

CPU 110 operates under program control to perform data processing operations upon defined data. The program controlling CPU 110 consists of a plurality of instructions that must be fetched before decoding and execution. Single core processor 100 includes a number of cache memories. FIG. 1 illustrates a pair of first level caches. Level one instruction cache (L1I) 111 stores instructions used by CPU 110. CPU 110 first attempts to access any instruction from level one instruction cache 121. Level one data cache (L1D) 112 stores data used by CPU 110. CPU 110 first attempts to access any required data from level one data cache 112. The two level one caches (L1I 111 and L1D 112) are backed by a level two unified cache (L2) 113. In the event of a cache miss to level one instruction cache 111 or to level one data cache 112, the requested instruction or data is sought from level two unified cache 113. If the requested instruction or data is stored in level two unified cache 113, then it is supplied to the requesting level one cache for supply to central processing unit core 110. As is known in the art, the requested instruction or data may be simultaneously supplied to both the requesting cache and CPU 110 to speed use.

Level two unified cache 113 is further coupled to higher level memory systems via memory controller 131. Memory controller 131 handles cache misses in level two unified cache 113 by accessing external memory (not shown in FIG. 1). Memory controller 131 handles all memory centric functions such as cacheabilty determination, error detection and correction, address translation and the like. Single core processor 100 may be a part of a multiprocessor system. In that case memory controller 131 handles data transfer between processors and maintains cache coherence among processors.

Figure 2:
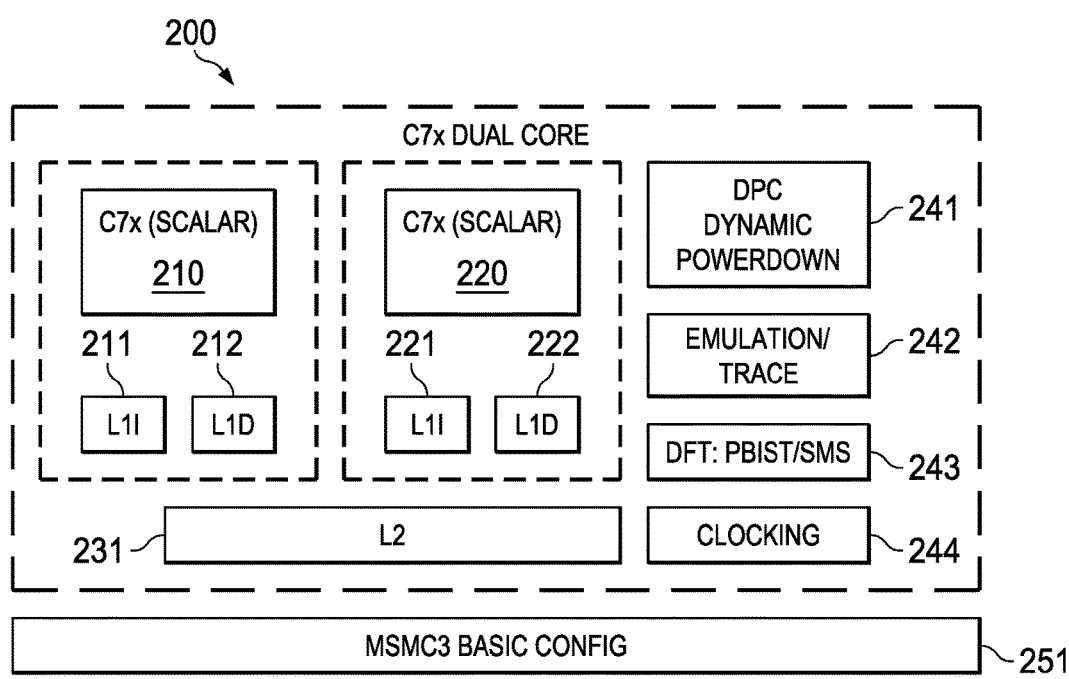
FIG. 2 illustrates a dual core scalar processor according to another embodiment of this invention.

FIG. 2 illustrates a dual core processor according to another embodiment of this invention. Dual core processor 200 includes first CPU 210 coupled to separate level one instruction cache (L1I) 211 and level one data cache (L1D) 212 and second CPU 220 coupled to separate level one instruction cache (L1I) 221 and level one data cache (L1D) 212. Central processing units 210 and 220 are preferably constructed similar to CPU 110 illustrated in FIG. 1. Dual core processor 200 includes a single shared level two combined instruction/data cache (L2) 231 supporting all four level one caches (L1I 211, L1D 212, L1I 221 and L1D 222). In the preferred embodiment CPU 210, level one instruction cache (L1I) 211, level one data cache (L1D) 212, CPU 220, level one instruction cache (L1I) 221, level one data cache (L1D) 222 and level two combined instruction/data cache (L2) 231 are formed on a single integrated circuit. This single integrated circuit preferably also includes auxiliary circuits such as power control circuit 241, emulation/trace circuits 242, design for test (DST) programmable built-in self test (PBIST) circuit 243 and clocking circuit 244. This single integrated circuit may also include memory controller 251.

Figure 3:
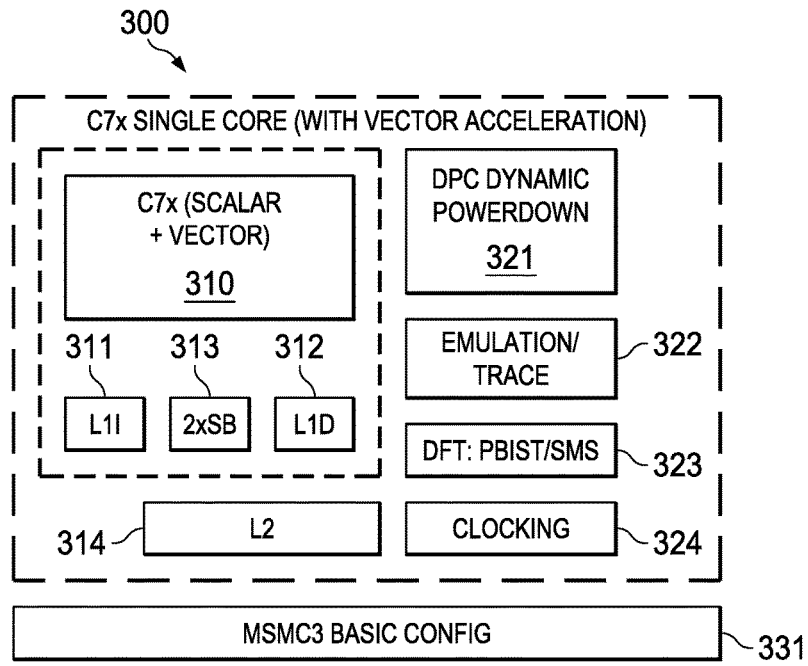
FIG. 3 illustrates a single core vector processor according to a further embodiment of this invention.
Figure 4:
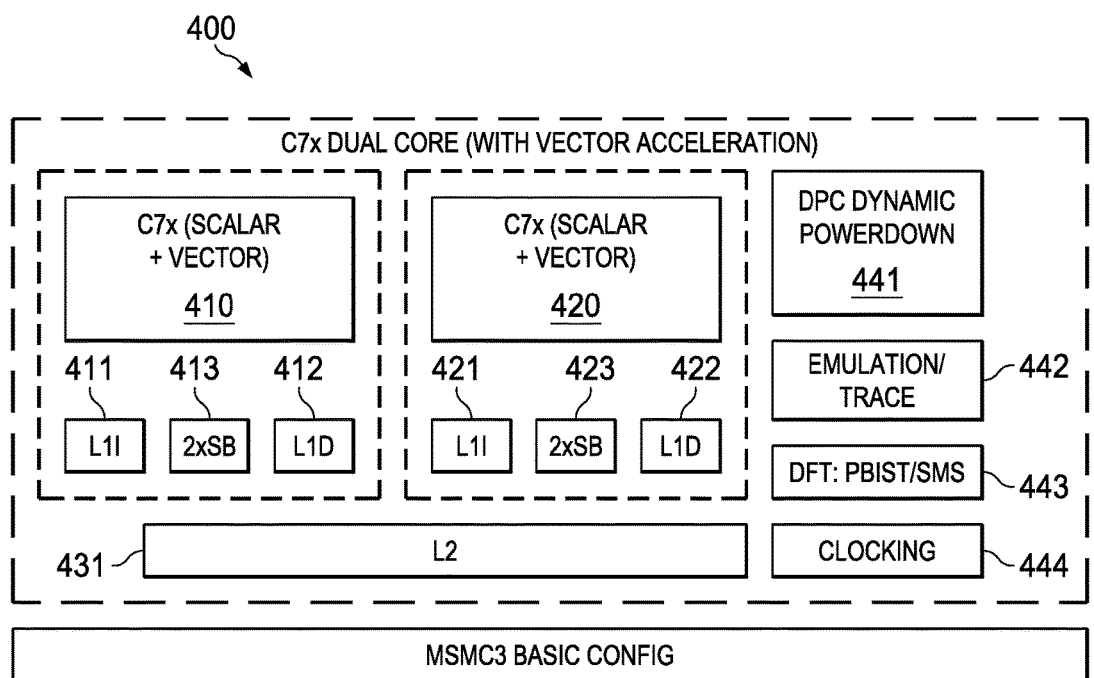
FIG. 4 illustrates a dual core vector processor according to a further embodiment of this invention.

FIGS. 3 and 4 illustrate single core and dual core processors similar to that shown respectively in FIGS. 1 and 2. FIGS. 3 and 4 differ from FIGS. 1 and 2 in showing vector central processing units. As further described below Single core vector processor 300 includes a vector CPU 310. Dual core vector processor 400 includes two vector CPUs 410 and 420. Vector CPUs 310, 410 and 420 include wider data path operational units and wider data registers than the corresponding scalar CPUs 110, 210 and 220.

Figure 5:
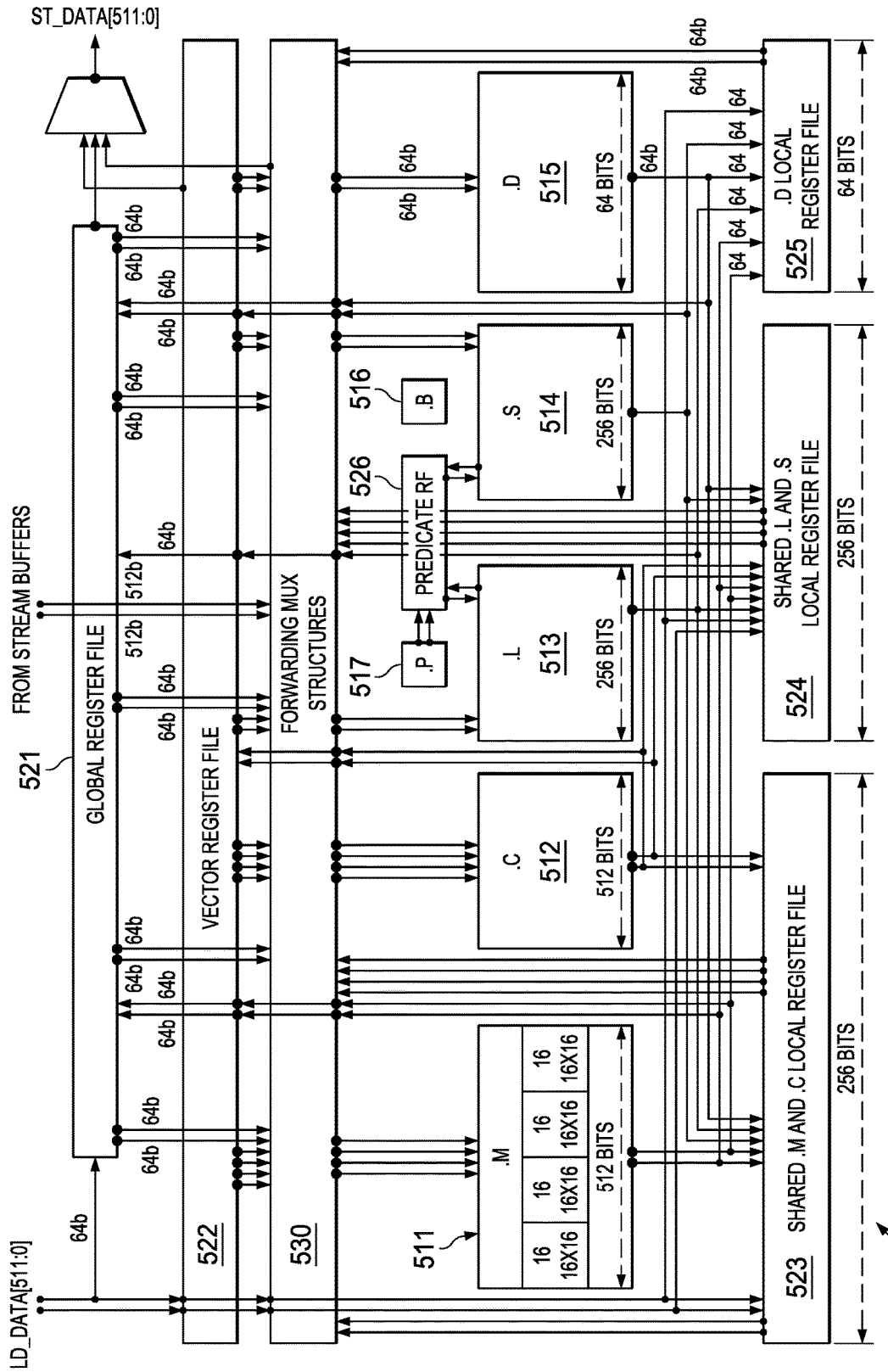
FIG. 5 illustrates construction of one embodiment of the CPU of this invention.

Vector CPUs 310, 410 and 420 further differ from the corresponding scalar CPUs 110, 210 and 220 in the inclusion of streaming engine 313 (FIG. 3) and streaming engines 413 and 423 (FIG. 5). Streaming engines 313, 413 and 423 are similar. Streaming engine 313 transfers data from level two unified cache 313 (L2) to a vector CPU 310. Streaming engine 413 transfers data from level two unified cache 431 to vector CPU 410. Streaming engine 423 transfers data from level two unified cache 431 to vector CPU 420. In accordance with the preferred embodiment each streaming engine 313, 413 and 423 manages up to two data streams.

Each streaming engine 313, 413 and 423 transfer data in certain restricted circumstances. A stream consists of a sequence of elements of a particular type. Programs that operate on streams read the data sequentially, operating on each element in turn. Every stream has the following basic properties. The stream data have a well-defined beginning and ending in time. The stream data have fixed element size and type throughout the stream. The stream data have fixed sequence of elements. Thus programs cannot seek randomly within the stream. The stream data is read-only while active. Programs cannot write to a stream while simultaneously reading from it. Once a stream is opened the streaming engine: calculates the address; fetches the defined data type from level two unified cache; performs data type manipulation such as zero extension, sign extension, data element sorting/swapping such as matrix transposition; and delivers the data directly to the programmed execution unit within the CPU. Streaming engines are thus useful for real-time digital filtering operations on well-behaved data. Streaming engines free these memory fetch tasks from the corresponding CPU enabling other processing functions.

The streaming engines provide the following benefits. They permit multi-dimensional memory accesses. They increase the available bandwidth to the functional units. They minimize the number of cache miss stalls since the stream buffer can bypass L1D. They reduce the number of scalar operations required in the loop to maintain. They manage the address pointers. They handle address generation automatically freeing up the address generation instruction slots and the .D unit for other computations.

FIG. 5 illustrates construction of one embodiment of the CPU of this invention. Except where noted this description covers both scalar CPUs and vector CPUs. The CPU of this invention includes plural execution units multiply unit 511 (.M), correlation unit 512 (.C), arithmetic unit 513 (.L), arithmetic unit 514 (.S), load/store unit 515 (.D), branch unit 516 (.B) and predication unit 517 (.P). The operation and relationships of these execution units are detailed below. In accordance with the preferred embodiment the CPU of FIG. 5 is a very long instruction (VLIW) CPU which fetches program fetch packets of sixteen instructions each instruction cycle. As described below these instructions may be executed by plural execution units in parallel during each instruction cycle.

Multiply unit 511 primarily performs multiplications. Multiply unit 511 accepts up to two double vector operands and produces up to one double vector result. Multiply unit 511 is instruction configurable to perform the following operations: various integer multiply operations, with precision ranging from 8-bits to 64-bits; various regular and complex dot product operations; and various floating point multiply operations; bit-wise logical operations; moves; as well as adds and subtracts. As illustrated in FIG. 5 multiply unit 511 includes hardware for four simultaneous 16 bit by 16 bit multiplications. Multiply unit 511 may access global scalar register file 521, global vector register file 522 and shared .M and C. local register 523 file in a manner described below. Forwarding multiplexer 530 mediates the data transfer between global scalar register file 521, global vector register file 522, the corresponding streaming engine and multiply unit 511.

Correlation unit 512 (.C) accepts up to two double vector operands and produces up to one double vector result. Correlation unit 512 supports these major operations. In support of WCDMA "Rake" and "Search" instructions correlation unit 512 performs up to 512 2-bit PN*8-bit I/Q complex multiplies per clock cycle. Correlation unit 512 performs 8-bit and 16-bit Sum-of-Absolute-Difference (SAD) calculations performing up to 512 SADs per clock cycle. Correlation unit 512 performs horizontal add and horizontal min/max instructions. Correlation unit 512 performs vector permutes instructions. Correlation unit 512 includes contains 8 256-bit wide control registers. These control registers are used to control the operations of certain correlation unit instructions. Correlation unit 512 may access global scalar register file 521, global vector register file 522 and shared .M and .C. local register file 523 in a manner described below. Forwarding multiplexer 530 mediates the data transfer between global scalar register file 521, global vector register file 522, the corresponding streaming engine and correlation unit 512.

CPU 500 includes two arithmetic units: arithmetic unit 513 (.L) and arithmetic unit 514 (.S). Each arithmetic unit 513 and arithmetic unit 514 accepts up to two vector operands and produces one vector result. The compute units support these major operations. Arithmetic unit 513 and arithmetic unit 514 perform various single-instruction-multiple-data (SIMD) fixed point arithmetic operations with precision ranging from 8-bit to 64-bits. Arithmetic unit 513 and arithmetic unit 514 perform various vector compare and minimum/maximum instructions which write results directly to predicate register file 526 (further described below). These comparisons include A=B, A>B, A≥B, A<B and A≤B. If the comparison is correct, a 1 bit is stored in the corresponding bit position within the predicate register. If the comparison fails, a 0 is stored in the corresponding bit position within the predicate register. Vector compare instructions assume byte (8 bit) data and thus generate 32 single bit results. Arithmetic unit 513 and arithmetic unit 514 perform various vector operations using a designated predicate register as explained below. Arithmetic unit 513 and arithmetic unit 514 perform various SIMD floating point arithmetic operations with precision ranging from half-precision (16-bits), single precision (32-bits) to double precision (64-bits). Arithmetic unit 513 and arithmetic unit 514 perform specialized instructions to speed up various algorithms and functions. Arithmetic unit 513 and arithmetic unit 514 may access global scalar register file 521, global vector register file 522, shared .L and .S local register file 524 and predicate register file 526. Forwarding multiplexer 530 mediates the data transfer between global scalar register file 521, global vector register file 522, the corresponding streaming engine and arithmetic units 513 and 514.

Load/store unit 515 (.D) is primarily used for address calculations. Load/store unit 515 is expanded to accept scalar operands up to 64-bits and produces scalar result up to 64-bits. Load/store unit 515 includes additional hardware to perform data manipulations such as swapping, pack and unpack on the load and store data to reduce workloads on the other units. Load/store unit 515 can send out one load or store request each clock cycle along with the 44-bit physical address to level one data cache (L1D). Load or store data width can be 32-bits, 64-bits, 256-bits or 512-bits. Load/store unit 515 supports these major operations: 64-bit SIMD arithmetic operations; 64-bit bit-wise logical operations; and scalar and vector load and store data manipulations. Load/store unit 515 preferably includes a micro-TLB (table lookaside buffer) block to perform address translation from a 48-bit virtual address to a 44-bit physical address. Load/store unit 515 may access global scalar register file 521, global vector register file 522 and .D local register file 525 in a manner described below. Forwarding multiplexer 530 mediates the data transfer between global scalar register file 521, global vector register file 522, the corresponding streaming engine and load/store unit 515.

Branch unit 516 (.B) calculates branch addresses, performs branch predictions, and alters control flows dependent on the outcome of the prediction.

Predication unit 517 (.P) is a small control unit which performs basic operations on vector predication registers. Predication unit 517 has direct access to the vector predication registers 526. Predication unit 517 performs different bit operations on the predication registers such as AND, ANDN, OR, XOR, NOR, BITR, NEG, SET, BITCNT (bit count), RMBD (right most bit detect), BIT Decimate and Expand, etc.

Figure 6:
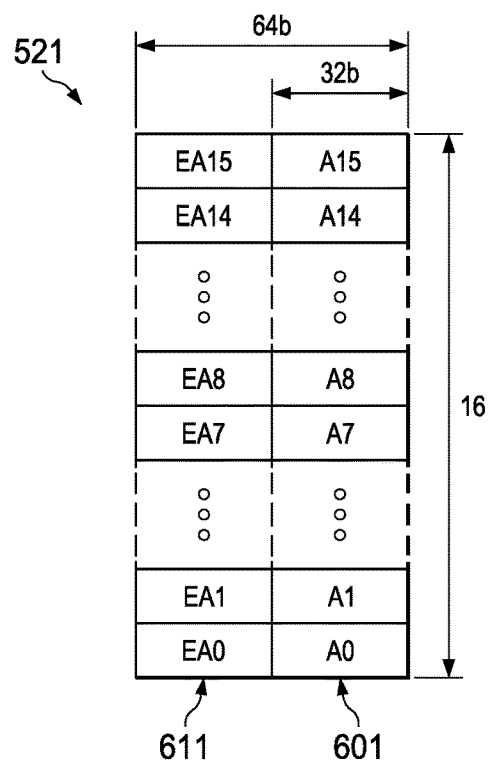
FIG. 6 illustrates the global scalar register file.

FIG. 6 illustrates global scalar register file 521. There are 16 independent 64-bit wide scalar registers. Each register of global scalar register file 521 can be read as 32-bits scalar data (designated registers A0 to A15 601) or 64-bits of scalar data (designated registers EA0 to EA15 611). However, writes are always 64-bit, zero-extended to fill up to 64-bits if needed. All scalar instructions of all functional units can read or write to global scalar register file 521. The instruction type determines the data size. Global scalar register file 521 supports data types ranging in size from 8-bits through 64-bits. A vector instruction can also write to the 64-bit global scalar registers 521 with the upper 192 bit data of the vector discarded. A vector instruction can also read 64-bit data from the global scalar register file 511. In this case the operand is zero-extended in the upper 192-bit to form an input vector.

Figure 7:
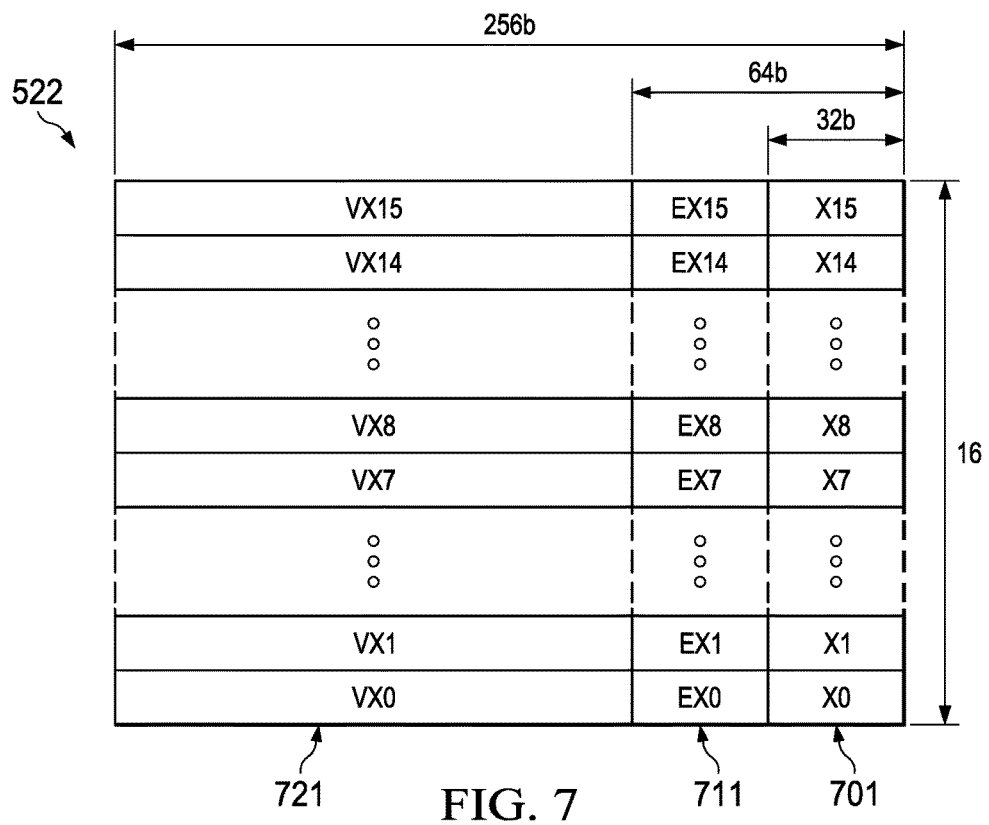
FIG. 7 illustrates global vector register file.

FIG. 7 illustrates global vector register file 522. There are 16 independent 256-bit wide vector registers. Each register of global vector register file 522 can be read as 32-bits scalar data (designated registers X0 to X15 701), 64-bits of scalar data (designated registers EX0 to EX15 711), 256-bit vector data (designated registers VX0 to VX15 721) or 512-bit double vector data (designated DVX0 to DVX7, not illustrated). In the current embodiment only multiply unit 511 and correlation unit 512 may execute double vector instructions. All vector instructions of all functional units can read or write to global vector register file 522. Any scalar instruction of any functional unit can also access the low 32 or 64 bits of a global vector register file 522 register for read or write. The instruction type determines the data size.

FIG. 8 illustrates local vector register file 523. There are 16 independent 256-bit wide vector registers. Each register of local vector register file 523 can be read as 32-bits scalar data (designated registers M0 to M15 701), 64-bits of scalar data (designated registers EM0 to EM15 711), 256-bit vector data (designated registers VM0 to VM15 721) or 512-bit double vector data (designated DVM0 to DVM7, not illustrated). In the current embodiment only multiply unit 511 and correlation unit 512 may execute double vector instructions. All vector instructions of all functional units can write to local vector register file 523. Only instructions of multiply unit 511 and correlation unit 512 may read from local vector register file 523. The instruction type determines the data size.

Multiply unit 511 may operate upon double vectors (512-bit data). Multiply unit 511 may read double vector data from and write double vector data to global vector register file 521 and local vector register file 523. Register designations DVXx and DVMx are mapped to global vector register file 521 and local vector register file 523 as follows.

TABLE 1

| Instruction Designation | Register Accessed |
|---|---|
| DVX0 | VX1:VX0 |
| DVX1 | VX3:VX2 |
| DVX2 | VX5:VX4 |
| DVX3 | VX7:VX6 |
| DVX4 | VX9:VX8 |
| DVX5 | VX11:VX10 |
| DVX6 | VX13:VX12 |
| DVX7 | VX15:VX14 |

TABLE 1-continued

| Instruction Designation | Register Accessed |
|---|---|
| DVM0 | VM1:VM0 |
| DVM1 | VM3:VM2 |
| DVM2 | VM5:VM4 |
| DVM3 | VM7:VM6 |
| DVM4 | VM9:VM8 |
| DVM5 | VM11:VM10 |
| DVM6 | VM13:VM12 |
| DVM7 | VM15:VM14 |

Each double vector designation maps to a corresponding pair of adjacent vector registers in either global vector register 522 or local vector register 523. Designations DVX0 to DVX7 map to global vector register 522. Designations DVM0 to DVM7 map to local vector register 523.

Local vector register file 524 is similar to local vector register file 523. There are 16 independent 256-bit wide vector registers. Each register of local vector register file 524 can be read as 32-bits scalar data (designated registers L0 to L15 701), 64-bits of scalar data (designated registers EL0 to EL15 711) or 256-bit vector data (designated registers VL0 to VL15 721). All vector instructions of all functional units can write to local vector register file 524. Only instructions of arithmetic unit 513 and arithmetic unit 514 may read from local vector register file 524.

FIG. 9 illustrates local register file 525. There are 16 independent 64-bit wide registers. Each register of local register file 525 can be read as 32-bits scalar data (designated registers D0 to D15 701) or 64-bits of scalar data (designated registers ED0 to ED15 711). All scalar and vector instructions of all functional units can write to local register file 525. Only instructions of load/store unit 515 may read from local register file 525. Any vector instructions can also write 64-bit data to local register file 525 with the upper 192 bit data of the result vector discarded. Any vector instructions can also read 64-bit data from the 64-bit local register file 525 registers. The return data is zero-extended in the upper 192-bit to form an input vector. The registers of local register file 525 can only be used as addresses in load/store instructions, not as store data or as sources for 64-bit arithmetic and logical instructions of load/store unit 515.

FIG. 10 illustrates the predicate register file 526. There are sixteen registers 32-bit registers in predicate register file 526. Predicate register file 526 contains the results from vector comparison operations and is used by vector selection instructions and vector predicated store instructions. A small subset of special instructions can also read directly from predicate registers, performs operations and write back to a predicate register directly. There are also instructions which can transfer values between the global register files (521 and 522) and predicate register file 526. Transfers between predicate register file 526 and local register files (523, 524 and 525) are not supported. Each bit of a predication register (designated P0 to P15) controls a byte of a vector data. Since a vector is 256-bits, the width of a predicate register equals 256/8=32 bits. The predicate register file can be written to by vector comparison operations to store the results of the vector compares.

A CPU such as CPU 110, 210, 220, 310, 410 or 420 operates on an instruction pipeline. This instruction pipeline can dispatch up to nine parallel 32-bits slots to provide instructions to the seven execution units (multiply unit 511, correlation unit 512, arithmetic unit 513, arithmetic unit 514, load/store unit 515, branch unit 516 and predication unit 517) every cycle. Instructions are fetched instruction packets of fixed length further described below. All instructions require the same number of pipeline phases for fetch and decode, but require a varying number of execute phases.

Figure 11:
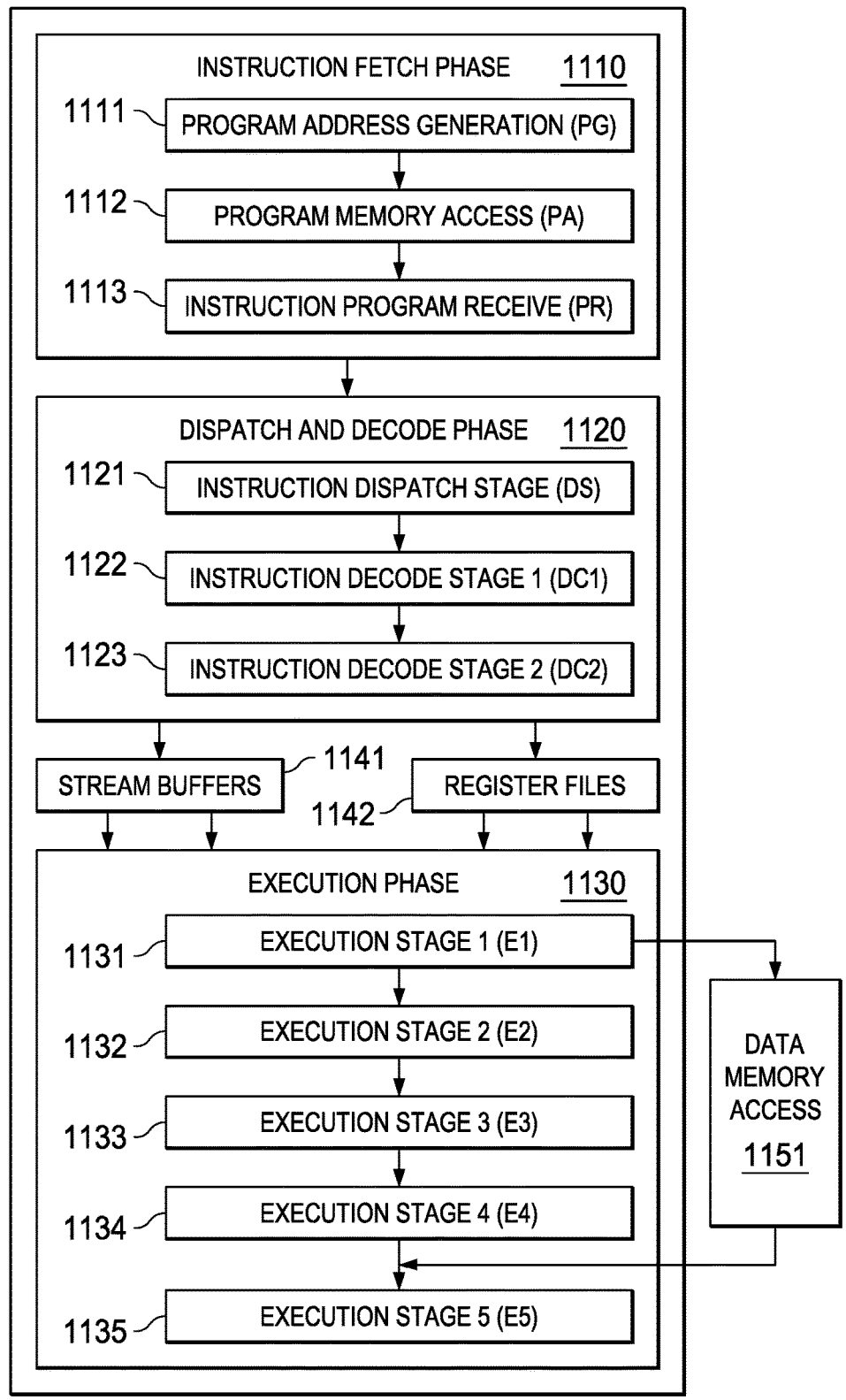
FIG. 11 illustrates the pipeline phases of the central processing unit according to a preferred embodiment of this invention.

FIG. 11 illustrates the following pipeline phases: program fetch phase 1110, dispatch and decode phases 1120 and execution phases 1130. Program fetch phase 1110 includes three stages for all instructions. Dispatch and decode phases 1120 include three stages for all instructions. Execution phase 1130 includes one to four stages dependent on the instruction.

Fetch phase 1110 includes program address generation stage 1111 (PG), program access stage 1112 (PA) and program receive stage 1113 (PR). During program address generation stage 1111 (PG), the program address is generated in the CPU and the read request is sent to the memory controller for the level one instruction cache L1I. During the program access stage 1112 (PA) the level one instruction cache L1I processes the request, accesses the data in its memory and sends a fetch packet to the CPU boundary. During the program receive stage 1113 (PR) the CPU registers the fetch packet.

Instructions are always fetched sixteen words at a time. FIG. 12 illustrates this fetch packet. FIG. 12 illustrates 16 instructions 1201 to 1216 of a single fetch packet. Fetch packets are aligned on 512-bit (16-word) boundaries. The execution of the individual instructions is partially controlled by a p bit in each instruction. This p bit is preferably bit 0 of the instruction. The p bit determines whether the instruction executes in parallel with another instruction. The p bits are scanned from lower to higher address. If the p bit of an instruction is 1, then the next following instruction is executed in parallel with (in the same cycle as) that instruction I. If the p bit of an instruction is 0, then the next following instruction is executed in the cycle after the instruction. All instructions executing in parallel constitute an execute packet. An execute packet can contain up to nine instructions. Each instruction in an execute packet must use a different functional unit. An execute packet can contain up to nine 32-bit wide slots. A slot can either be a self-contained instruction or expand the constant field specified by the immediate preceding instruction. A slot can be used as conditional codes to apply to the instructions within the same fetch packet. A fetch packet can contain up to 2 constant extension slots and one condition code extension slot.

There are up to 11 distinct instruction slots, but scheduling restrictions limit to 9 the maximum number of parallel slots. The maximum nine slots are shared as follows: multiply unit 511; correlation unit 512; arithmetic unit 513; arithmetic unit 514; load/store unit 515; branch unit 516 shared with predicate unit 517; a first constant extension; a second constant extension; and a unit less instruction shared with a condition code extension. The last instruction in an execute packet has a p bit equal to 0.

The CPU and level one instruction cache L1I pipelines are de-coupled from each other. Fetch packet returns from level one instruction cache L1I can take different number of clock cycles, depending on external circumstances such as whether there is a hit in level one instruction cache L1I. Therefore program access stage 1112 (PA) can take several clock cycles instead of 1 clock cycle as in the other stages.

Dispatch and decode phases 1120 include instruction dispatch to appropriate execution unit stage 1121 (DS); instruction pre-decode stage 1122 (DC1); and instruction decode, operand reads stage 1123 (DC2). During instruction dispatch to appropriate execution unit stage 1121 (DS) the fetch packets are split into execute packets and assigned to the appropriate functional units. During the instruction predecode stage 1122 (DC1) the source registers, destination registers, and associated paths are decoded for the execution of the instructions in the functional units. During the instruction decode, operand reads stage 1123 (DC2) more detail unit decodes are done, as well as reading operands from the register files.

Execution phases 1130 includes execution stages 1131 to 1135 (E1 to E5). Different types of instructions require different numbers of these stages to complete their execution. These stages of the pipeline play an important role in understanding the device state at CPU cycle boundaries.

During execute 1 stage 1131 (E1) the conditions for the instructions are evaluated and operands are operated on. As illustrated in FIG. 11, execute 1 stage 1131 may receive operands from a stream buffer 1141 and one of the register files shown schematically as 1142. For load and store instructions, address generation is performed and address modifications are written to a register file. For branch instructions, branch fetch packet in PG phase is affected. As illustrated in FIG. 11, load and store instructions access memory here shown schematically as memory 1151. For single-cycle instructions, results are written to a destination register file. This assumes that any conditions for the instructions are evaluated as true. If a condition is evaluated as false, the instruction does not write any results or have any pipeline operation after execute 1 stage 1131.

During execute 2 stage 1132 (E2) load instructions send the address to memory. Store instructions send the address and data to memory. Single-cycle instructions that saturate results set the SAT bit in the control status register (CSR) if saturation occurs. For 2-cycle instructions, results are written to a destination register file.

During execute 3 stage 1133 (E3) data memory accesses are performed. Any multiply instructions that saturate results set the SAT bit in the control status register (CSR) if saturation occurs. For 3-cycle instructions, results are written to a destination register file.

During execute 4 stage 1134 (E4) load instructions bring data to the CPU boundary. For 4-cycle instructions, results are written to a destination register file.

During execute 5 stage 1135 (E5) load instructions write data into a register. This is illustrated schematically in FIG. 11 with input from memory 1151 to execute 5 stage 1135.

FIG. 13 illustrates an example of the instruction coding of instructions used by this invention. Each instruction consists of 32 bits and controls the operation of one of the individually controllable functional units (multiply unit 511, correlation unit 512, arithmetic unit 513, arithmetic unit 514, load/store unit 515). The bit fields are defined as follows. The creg field and the z bit are optional fields used in conditional instructions. These bits are used for conditional instructions to identify the predicate register and the condition. The z bit (bit 28) indicates whether the predication is based upon zero or not zero in the predicate register. If z=1, the test is for equality with zero. If z=0, the test is for nonzero. The case of creg=0 and z=0 is treated as always true to allow unconditional instruction execution. The creg field and the z field are encoded in the instruction as shown in Table 2.

TABLE 2

| | Conditional Register | | | |
| --- | --- | --- | --- | --- |
| | creg | | | z |
| | 31 | 30 | 29 | 28 |
| Unconditional | 0 | 0 | 0 | 0 |
| Reserved | 0 | 0 | 0 | 1 |
| A0 | 0 | 0 | 1 | z |
| A1 | 0 | 1 | 0 | z |
| A2 | 0 | 1 | 1 | z |
| A3 | 1 | 0 | 0 | z |
| A4 | 1 | 0 | 1 | z |
| A5 | 1 | 1 | 0 | z |
| Reserved | 1 | 1 | x | x |

Note that "z" in the z bit column refers to the zero/not zero comparison selection noted above and "x" is a don't care state. This coding can only specify a subset of the 16 global scalar registers as predicate registers. This selection was made to preserve bits in the instruction coding. Note that unconditional instructions do not have these optional bits. For unconditional instructions these bits (28 to 31) are preferably used as additional opcode bits. However, if needed, an execute packet can contain a unique 32-bit condition code extension slot which contains the 4-bit creg/z fields for the instructions which are in the same execute packet. Table 3 shows the coding of such a condition code extension slot.

TABLE 3

| Bits | Functional Unit |
| --- | --- |
| 3:0 | .L |
| 7:4 | .S |
| 11:5 | .D |
| 15:12 | .M |
| 19:16 | .C |
| 23:20 | .B |
| 28:24 | Reserved |
| 31:29 | Reserved |

Thus the condition code extension slot specifies bits decoded in the same way the creg/z bits assigned to a particular functional unit in the same execute packet.

Special vector predicate instructions use the designated predicate register to control vector operations. In the current embodiment all these vector predicate instructions operate on byte (8 bit) data. Each bit of the predicate register controls whether a SIMD operation is performed upon the corresponding byte of data. The operations of predicate unit 517 permit a variety of compound vector SIMD operations based upon more than one vector comparison. For example a range determination can be made using two comparisons. A candidate vector is compared with a first vector reference having the minimum of the range packed within a first data register. A second comparison of the candidate vector is made with a second reference vector having the maximum of the range packed within a second data register. Logical combinations of the two resulting predicate registers would permit a vector conditional operation to determine whether each data part of the candidate vector is within range or out of range.

The dst field specifies a register in a corresponding register file as the destination of the instruction results.

The src2 field specifies a register in a corresponding register file as the second source operand.

The src1/cst field has several meanings depending on the instruction opcode field (bits 2 to 12 and additionally bits 28 to 31 for unconditional instructions). The first meaning specifies a register of a corresponding register file as the first operand. The second meaning is an immediate constant. Depending on the instruction type, this is treated as an unsigned integer and zero extended to a specified data length or is treated as a signed integer and sign extended to the specified data length.

The opcode field (bits 2 to 12 for all instructions and additionally bits 28 to 31 for unconditional instructions) specifies the type of instruction and designates appropriate instruction options. This includes designation of the functional unit and operation performed. A detailed explanation of the opcode is beyond the scope of this invention except for the instruction options detailed below.

The p bit (bit 0) marks the execute packets. The p-bit determines whether the instruction executes in parallel with the following instruction. The p-bits are scanned from lower to higher address. If p=1 for the current instruction, then the next instruction executes in parallel with the current instruction. If p=0 for the current instruction, then the next instruction executes in the cycle after the current instruction. All instructions executing in parallel constitute an execute packet. An execute packet can contain up to eight instructions. Each instruction in an execute packet must use a different functional unit.

Correlation unit 512 and arithmetic units 513 and 514 often operate in a single instruction multiple data (SIMD) mode. In this SIMD mode the same instruction is applied to packed data from the two operands. Each operand holds plural data elements disposed in predetermined slots. SIMD operation is enabled by carry control at the data boundaries. Such carry control enables operations on varying data widths.

FIG. 14 illustrates the carry control. AND gate 1401 receives the carry output of bit N within the operand wide arithmetic logic unit (256 bits for arithmetic units 513 and 514, 512 bits for correlation unit 512). AND gate 1401 also receives a carry control signal which will be further explained below. The output of AND gate 1401 is supplied to the carry input of bit N+1 of the operand wide arithmetic logic unit. AND gates such as AND gate 1401 are disposed between every pair of bits at a possible data boundary. For example, for 8-bit data such an AND gate will be between bits 7 and 8, bits 15 and 16, bits 23 and 24, etc. Each such AND gate receives a corresponding carry control signal. If the data size is of the minimum, then each carry control signal is 0, effectively blocking carry transmission between the adjacent bits. The corresponding carry control signal is 1 if the selected data size requires both arithmetic logic unit sections. Table 4 below shows example carry control signals for the case of a 256 bit wide operand such as used in arithmetic units 513 and 514 which may be divided into sections of 8 bits, 16 bits, 32 bits, 64 bits or 128 bits. No control of the carry output of the most significant bit is needed, thus only 31 carry control signals are required.

TABLE 4

| Data Size | Carry Control Signals |
|---|---|
| 8 bits | –000 0000 0000 0000 0000 0000 0000 0000 |
| 16 bits | –101 0101 0101 0101 0101 0101 0101 0101 |
| 32 bits | –111 0111 0111 0111 0111 0111 0111 0111 |
| 64 bits | –111 1111 0111 1111 0111 1111 0111 1111 |

TABLE 4-continued

| Data Size | Carry Control Signals |
|---|---|
| 128 bits | –111 1111 1111 1111 0111 1111 1111 1111 |
| 256 bits | –111 1111 1111 1111 1111 1111 1111 1111 |

It is typical in the art to operate on data sizes that are integral powers of 2 ($2^N$). However, this carry control technique is not limited to integral powers of 2. One skilled in the art would understand how to apply this technique to other data sizes and other operand widths.

This invention hides the page miss translation latency for many instruction fetches. In this invention whenever an access is requested by CPU, the L1I controller does an a-priori determination of whether the most recent virtual address crosses a page boundary. If the access crosses a page boundary crossing, the L1I cache controller will request a second page translation entry to the μTLB without waiting for L1I cache controller to begin processing the second page requests. This becomes a deterministic prefetch of the second page translation request. The address translation information for the second page is stored locally in L1I cache controller and used when the access crosses the page boundary.

In the preferred embodiment of this invention, the μTLB to MMU requests are pipelined. Whether the μTLB requests are pipelined or not, this scheme hides some page miss translation latency. This improves the program memory cache performance significantly.

Figure 15:
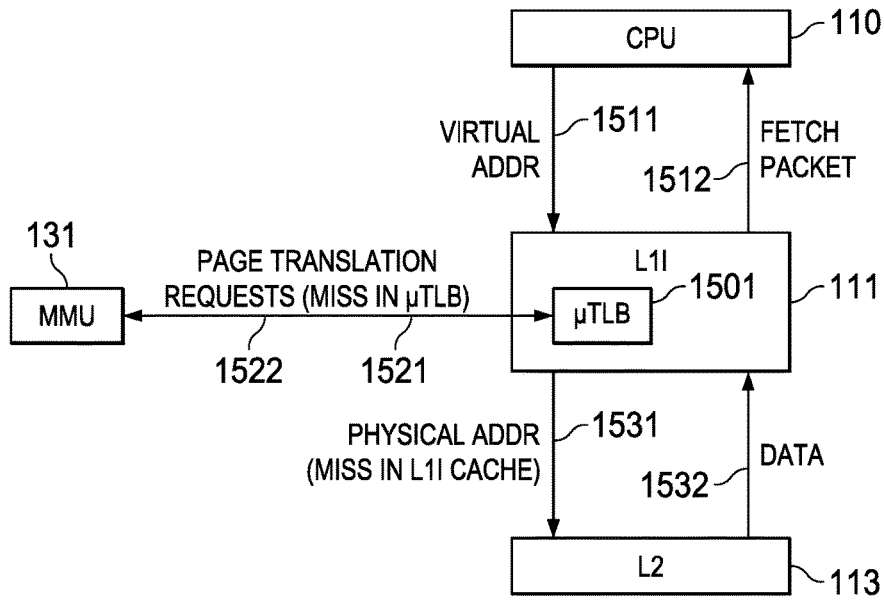
FIG. 15 illustrates the key parts of this invention.

FIG. 15 illustrates the key parts of this invention. FIG. 15 employs reference numerals from the scalar single core example of FIG. 1 for simplicity of illustration. Those skilled in the art would realize this invention could be practiced with any of the examples illustrated in FIGS. 1 to 4. In particular, this invention can be practiced with the dual processor examples illustrated in FIGS. 2 and 4 with the level two unified cache shared between the dual processors. Central processing unit (CPU) 110 is coupled to level one instruction cache (L1I) 111. Level one instruction cache 111 is further connected to memory management unit (MMU) 131 corresponding to the memory controller 131 illustrated in FIG. 1 and to L2 cache 113. FIG. 15 illustrates micro table look-aside buffer (μTLB) 1501 included as part of L1I cache 111. FIG. 15 illustrates the following signals passed between CPU 110 and L1I cache 111: virtual address 1511; and fetch packet 1512. FIG. 15 illustrates bidirectional data flow between L1I cache 111 and MMU 131 including: page translations entry requests 1521; and page translation entries 1522. FIG. 15 illustrates the following signals passed between L1I cache 111 and L2 cache 113; physical address 1531; and data 1532.

Figure 16:
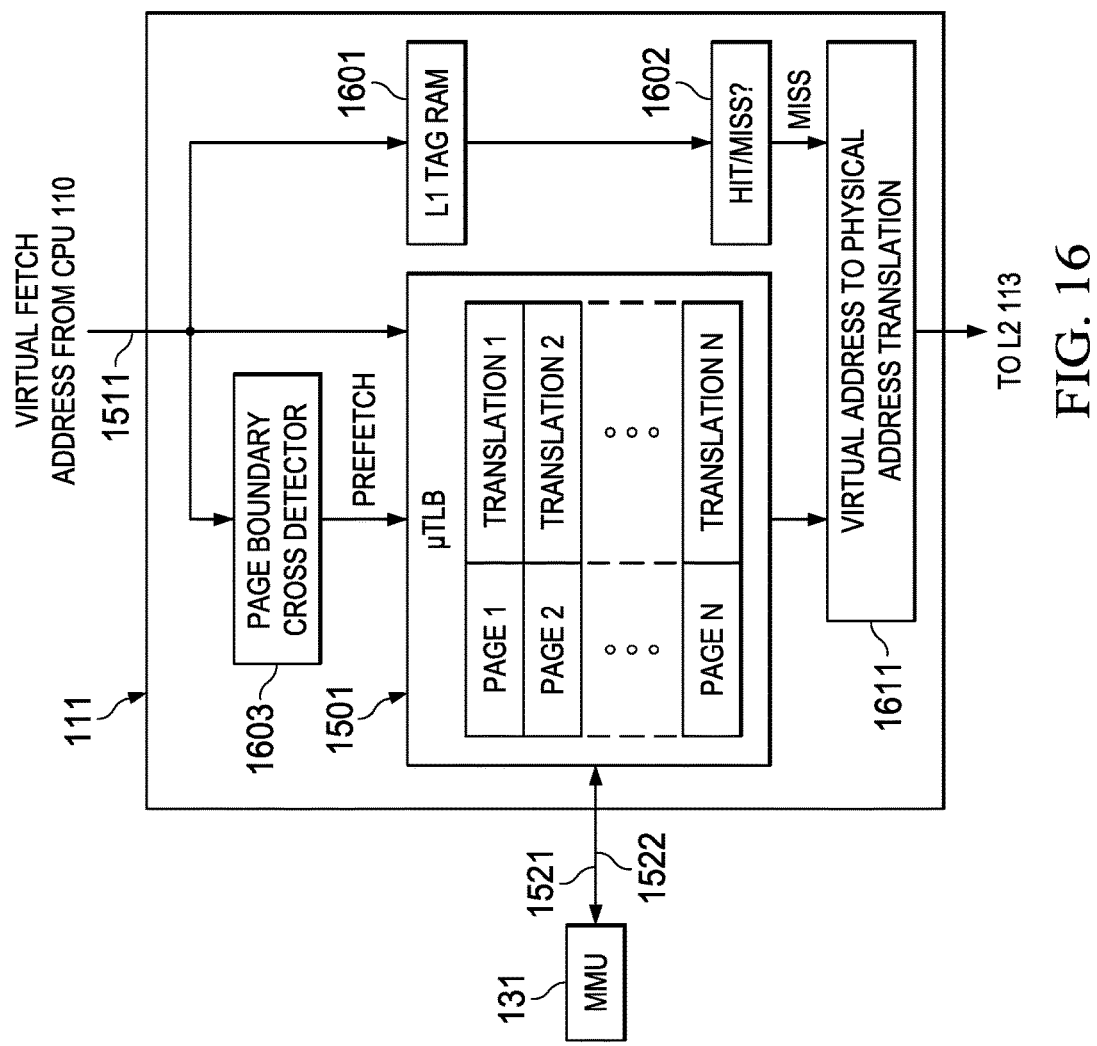
FIG. 16 illustrates the virtual to physical address translation of this invention.

The virtual to physical address translation operates as shown in FIG. 16. In this example CPU 110 operates employing a virtual address. L1I cache 111 also employs virtual addresses. L2 cache 113 employs physical addresses. Accesses to L2 cache 113 from CPU 110 must undergo address translation from a virtual address to a physical address. Note some parts of L1I cache 111 are omitted for clarity of illustration.

Upon a need for another fetch packet of instructions, CPU 110 supplies the virtual address 1511 of the needed fetch packet. Virtual address 1511 is supplied to L1I tag RAM 1601. L1I tag RAM 1601 compares virtual address 1511 to tags indicating which addresses are cached. Hit/miss unit 1602 determines whether the virtual address accesses cached data (hit) or does not access cached data (miss). By its nature L1I cache 111 cannot contain all program instructions that may be used by CPU 110. L1I cache stores a limited subset of these program instructions. According to temporal and spatial locality principles, a CPU access to a memory location storing program instructions makes access to the same and nearby memory locations likely. If hit/miss unit 1602 determines the requested fetch packet is stored in L1I cache 113, then this fetch packet is supplied to CPU 110 from the L1I cache 111 data memory (not illustrated) via fetch packet 1512 (FIG. 15).

If hit/miss unit 1601 determines the requested fetch packet is not stored in L1I cache 111 (miss), then this fetch packet is requested from L2 cache 113. Because L1I cache 111 is virtually tagged and L2 cache 113 is physically tagged, this requires an address translation. At the same time the virtual address 1511 is supplied to L1I tag RAM 1601, the virtual address is also supplied to μTLB 1501 and to page boundary cross detector 1603. Address translation is typically performed using a table of most significant bits of virtual addresses and the corresponding most significant bits of physical addresses. FIG. 16 illustrates a part of this table having virtual addresses (Page 1, Page 2 . . . Page N) and the corresponding address translation bits (Translation 1, Translation 2 . . . Translation N). In this example upon detecting the correct address pair, the corresponding address translation data is supplied to virtual address to physical address translation 1611. Virtual address to physical address translation 1611 makes the address translation by substituting the most significant physical address bits from μTLB 1501 for the most significant virtual address bits of virtual address 1511. It is typical that the least significant bits of the virtual address are the same as the least significant bits of the physical address. In this example the basic virtual address/physical address translation table is stored in MMU 131. In addition, L1I cache 111 includes μTLB 1501 which stores some of the address translation table entries in a cache-like fashion. When servicing an address translation, the requested virtual address 1511 is compared with address translation table entries stored in μTLB 1501. If virtual address 1511 matches a table entry in μTLB 1501, the matching table entry is used for address translation in virtual address to physical address translation 1611. Upon such a μTLB hit, virtual address to physical address translation 1611 performs the address translation in a single cycle. If virtual address 1511 does not match any table entry in μTLB 1501, then these address translation parameters must be fetched from the MMU 131. μTLB 1501 transmits page translation entry request 1521 for virtual address 1511 to MMU 131. It may require tens or hundreds of cycles to perform this fetch depending on the page translation and page table walk latency in the MMU. MMU 131 finds the corresponding address translation entry and returns this entry 1522 to μTLB 1501. μTLB 1501 stores this newly fetched translation entry, typically casting out an entry currently stored in μTLB 1501 to make room. Virtual address to physical address translation 1611 performs the address translation using the newly stored translation entry. Following address translation the physical address passes to L2 cache 113 via request physical address to L2 unit 1631. Note this request is conditional on hit/miss unit 1602 indicating a cache miss in L1I cache 111. Supply of a physical address to L2 cache 113 is not required when hit/miss unit 1602 indicates a hit, because this hit indicates the memory access can be serviced from L1I cache 111.

FIG. 16 illustrates a further refinement of this invention to reduce the latency occurring upon a miss in μTLB 1501. This technique utilizes information to predict a possible micro translation look-aside table miss before it occurs. The sequence of addresses in program fetch is expected to be linear or at least piece-wise linear. A program fetch address sequence that crossed into a new memory page is more likely to proceed to the next following memory page than to proceed to an unrelated page. Page boundary cross detector 1603 determines when a new virtual address 1511 received form CPU 110 crosses a page boundary. If a page boundary is crossed, page boundary cross detector 1603 sends a prefetch signal to μTLB 1501. In response μTLB 1501 determines whether it stores an address translation entry for this next memory page. No further action is needed if μTLB 1501 stores the address translation data for this next page. If μTLB 1501 does not store the address translation data for this next page, then μTLB 1501 transmits a page translations entry request 1521 to MMU 131. μTLB 1501 stores corresponding address translation data upon receiving page translation entries 1522 from MMU 131. Either case ensures that the address translation data for the next page is stored in μTLB 1501 ready for use if the program fetch address sequence proceeds to this next page. The prefetch of the next page address translation data hides page fetch latency by requests this data before it is needed.

Page boundary cross detect 1603 may employ one of two options. As described above page boundary cross detect 1603 may detect when a linear walk through memory crosses into another memory page. As a second option page boundary cross detect 1603 may detect each time the virtual address 1511 accesses a different memory page than the previous access. As noted above the address sequence for program fetch is substantially linear. A branch to a different page probably is the start of a program module to which the linearity assumption will also apply. Thus there is utility in causing page boundary cross detect 1603 to detect any access to a new page. Whether this new page access is a linear walk or the start of a different program module, the linearity assumption is still helpful and fetching the next page address translation parameters is useful.

As noted above in the preferred embodiment of this invention the μTLB 1501 to MMU 131 requests are pipelined. In addition, preferably the page translation entries 1522 returned from MMU 131 to μTLB 1501 need not be in the same order as the page translations entry requests 1521 sent from μTLB 1501 to MMU 131. In the preferred embodiment the interface between MMU 131 and μTLB 1501 can handle plural requests simultaneously (pipelined). The organization of MMU 131 may cause different latency for different page table entries. MMU 131 preferably tracks the page translations entry request 1521 corresponding to a returned page translation entry 1522. This permits μTLB 1501 to match the returned page translation entry 1522 to the corresponding page translations entry request 1521. This enables μTLB 1501 to handle out-of-order returned page translation entries 1522.

Figure 17:
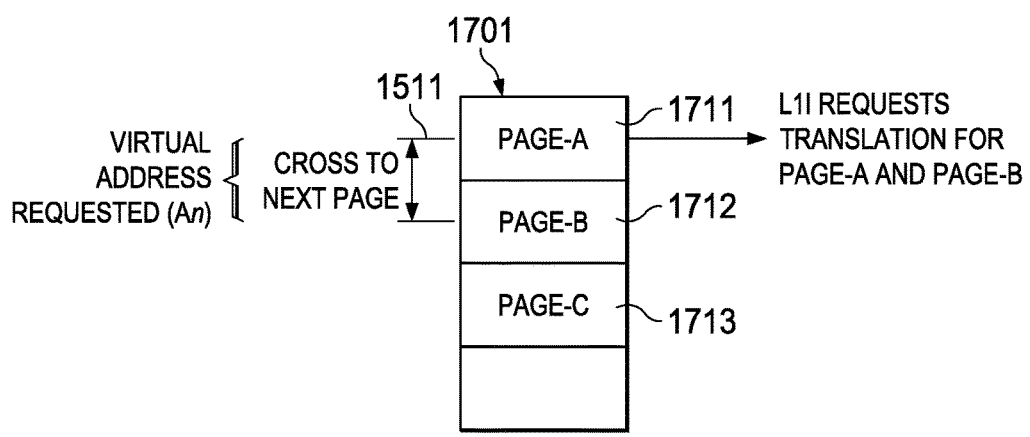
FIG. 17 illustrates schematically illustrates operation of this invention.

FIG. 17 schematically illustrates operation of this invention. CPU 110 generates an instruction fetch virtual address 1511. In this example fetch virtual address 1511 points to page A 1711 in memory map 1701. As shown in Figure instruction fetch address sequence crosses the page boundary between page A 1711 and page B 1712. Upon this determination μTLB 1501 requests page translation entry page C 1712. This means that if the path through the program code crosses the page boundary, the page translation table entry for that new page (page C 1713) is already stored in μTLB 1501. Latency for fetching the page translation table entry for the new page is hidden by the early fetch.

This invention assumes the fetch address sequence having once crossed a page boundary will proceed to the cross the following page boundary. Upon a new page detection, the μTLB 1501 requests the page translation table entry for the next page. This page translation table entry is thus requested before CPU 110 actually accesses the fetch packet in the next page. The page translation table entry fetch may require a long time to service. In addition the time to complete this page translation table entry fetch may be highly variable in a manner not visible to CPU 110. Thus early request under circumstances where a miss to μTLB 1501 is likely is advantageous. The part of the μTLB 1501 miss latency between the detection of a page boundary crossing and the next page boundary crossing corresponding to a CPU 110 instruction request is thus hidden in this invention.

If the access prediction is incorrect and the program does not access the next page, then this invention performs an unneeded page translation table entry fetch. This is not expected to degrade system performance. Incorrect prediction of access to the next page would generally occur upon a program branch. In such a case the program typically branches to a page different from both the page of the original access and the next page. A page miss caused by such a branch is likely. The unneeded fetch of the second page translation table entry of this invention would be unrelated to the incorrectly predicted branch page miss. Accordingly, this invention will typically not degrade performance in the case of an incorrect branch prediction.

Note that due to differences in replacement methods, μTLB 1501 may not store page translation table entries for all program instructions stored in L1I 111. Thus it is possible for a particular instruction access to generate any of the four combinations of L1I hit/miss and μTLB 1501 next page hit/miss. Table 5 lists the actions taken in a preferred embodiment of this invention.

TABLE 5

| μTLB next page | L1I | Action |
| --- | --- | --- |
| miss | miss | Prefetch page table entry and instructions |
| miss | hit | Prefetch page table entry |
| hit | miss | Prefetch instructions |
| hit | hit | No Action |

The instruction prefetch is optional in this invention. Servicing a miss in L1I cache 111 is expected to generally require less time and have less variability than servicing a page entry miss in μTLB 1501. Thus there is less need for instruction prefetch as for the page translation table entry prefetch.

This invention assumes that a next page translation entry will eventually be requested from μTLB and prefetches it before the first address belonging to this next page is requested by L1I cache controller. Some or all of the miss latency of next page translation entry fetch is thus hidden. This reduces the stall cycles, which improves the IPC (instructions per cycle) execution metric of the CPU.

This invention has been described as applicable to fetch packets in accordance with the very long instruction work (VLIW) CPU of the preferred embodiment illustrated in FIG. 5. Those skilled in the art would realize this invention is equally applicable to CPUs which fetch single instructions per cycle. In that event, the number of fetch packets from the branch prediction hardware of the CPU is a number of instructions because the number of instructions in a fetch packet is 1.

This invention is described in conjunction with the preferred embodiment translating virtual addresses to physical addresses. Those skilled in the art would recognize this invention is equally applicable to the opposite translation from a physical address to a virtual address. This invention enables enhanced translation from a first address domain to a second address domain when crossing a page boundary is predicted.

This invention is described in conjunction with the preferred embodiment of instruction fetch. Instruction fetch ordinarily takes place linearly, in contrast to data fetch which has no general pattern. It is expected to be easier to predict crossing a page boundary for instruction fetch than for data fetch. Nevertheless this invention in certain limited circumstances may be valuable for data fetch.

What is claimed is:

1. A method of address translation comprising the steps of:
receiving a first address of a memory access in a first address domain;
searching a micro translation look-aside buffer for a first address translation entry of a memory page corresponding to said first address;
if said first address translation entry is not stored in said micro translation look-aside buffer
recalling said first address translation entry from an external source, and
storing said recalled first address translation entry in the micro translation look-aside buffer;
translating said first address to a second address in a second domain according to said first address translation entry;
determining whether said first address corresponds to an address translation entry of a next memory page from a prior address;
if said first address translation entry corresponds to an address translation entry of a next memory page, searching the micro translation look-aside buffer for a second following address translation entry; and
if said second following address translation entry is not stored in said micro translation look-aside buffer
recalling said second following address translation entry from the external source, and
storing said recalled second following address translation entry in the micro translation look-aside buffer.

2. The method of address translation of claim 1, wherein:
said memory access in the first address domain is an instruction fetch.

3. The method of address translation of claim 1, wherein:
said memory access in said first address domain is an instruction fetch of a fetch packet of instructions including plural consecutive instructions.

4. The method of address translation of claim 3, wherein:
said step of determining whether said first address corresponds to an address translation entry of a next memory from a prior address includes determining whether a linear address sequence crosses to said next memory page.

5. The method of address translation of claim 4, wherein:
said step of determining whether said first address corresponds to a next address translation entry from a prior address includes determining whether said first address is a branch to said next memory page.

6. A method of address translation comprising the steps of:
- receiving a first address of a memory access in a first address domain;
- searching a micro translation look-aside buffer for a first address translation entry of a memory page corresponding to said first address;
- if said first address translation entry is not stored in said micro translation look-aside buffer
  - recalling said first address translation entry from an external source, and
  - storing said recalled first address translation entry in the micro translation look-aside buffer;
- translating said first address to a second address in a second domain according to said first address translation entry;
- determining whether said first address corresponds to an address translation entry of a next memory page from a prior address;
- if said first address translation entry corresponds to an address translation entry of a next memory page, searching the micro translation look-aside buffer for said second following address translation entry; and
- if said second following address translation entry is not stored in said micro translation look-aside buffer
  - recalling said second following address translation entry from the external source,
  - storing said recalled second following address translation entry in the micro translation look-aside buffer;
- each of said steps of recalling said first translation entry from the external source and recalling said second following address translation entry from the external source includes
  - supplying said address to the external source,
  - recalling an address translation entry corresponding to said address from the external source,
  - returning said recalled address translation entry from the external source to the micro translation look-aside buffer together with an indication corresponding to said address, whereby the micro translation look-aside buffer may properly store an out-of-order recalled address translation entry.

7. A data processing apparatus employing address translation comprising:
- a central processing unit performing data processing operations upon data under instruction control, said central processing unit generating memory accesses at corresponding first addresses in a first address domain;
- a memory management unit including a virtual address/physical address translation table storing a plurality of address translations entries, each address translation entry including a first predetermined number of most significant address bits of said first address domain and a corresponding second predetermined number of most significant address bits of a second address domain for a corresponding memory page;
- an address translation unit connected to said central processing unit and said memory management unit, said address translation unit including a page boundary cross detector, a micro translation look-aside buffer storing a subset of said plurality of address translations entries, and a virtual address to physical address translator, said address translation unit operable to translate memory accesses from said central processing unit from said first address domain to a second address domain by
  - searching said micro translation look-aside buffer for a first address translation entry corresponding to a current first address;
  - if said first address translation entry is not stored in said micro translation look-aside buffer
    - recalling said first address translation entry from said memory management unit, and
    - storing said recalled first address translation entry in said micro translation look-aside buffer;
  - employing said a virtual address to physical address translator to translate said first address to a second address in a second domain according to said first address translation entry by substituting said second predetermined most significant bits of said second address domain for said first predetermined most significant bits of said first address domain of said address translation entry;
- said address translation unit further operable to
  - determine via said page boundary cross detector whether said first address corresponds to an address translation entry of a next memory page from a prior address,
  - if said first address corresponds to an address translation entry of a next memory page, search said micro translation look-aside buffer for said next address translation entry, and
  - if said next address translation entry is not stored in said micro translation look-aside buffer
    - recall said next address translation entry from said memory management unit, and
    - store said recalled next address translation entry in the micro translation look-aside buffer.

8. The data processing apparatus employing address translation of claim 7, wherein:
- said memory accesses in the first address domain are instruction fetches.

9. The data processing apparatus employing address translation of claim 7, wherein:
- said central processing unit is a very long instruction word central processing unit including plural functional units, wherein said memory accesses in said first address domain are instruction fetches of a fetch packet of instructions including plural consecutive instructions.

10. The data processing apparatus employing address translation of claim 7, wherein:
- said address translation unit is further operable via said page boundary cross detector to determine whether said first address corresponds to an address translation entry of a next memory from a prior address by determining whether a linear address sequence crosses to said next memory page.

11. The data processing apparatus employing address translation of claim 7, wherein:
- said address translation unit is further operable via said page boundary cross detector to determine whether said first address corresponds to a next address translation entry from a prior address by determining whether said first address is a branch to said next memory page.

12. A data processing apparatus employing address translation comprising:
- a central processing unit performing data processing operations upon data under instruction control, said central processing unit generating memory accesses at corresponding first addresses in a first address domain;
- a memory management unit including a virtual address/physical address translation table storing a plurality of address translations entries, each address translation entry including a first predetermined number of most significant address bits of said first address domain and a corresponding second predetermined number of most significant address bits of a second address domain for a corresponding memory page;

said memory management is further operable to return said recalled first address translation entry to the micro translation look-aside buffer together with an indication corresponding to said first address;

an address translation unit connected to said central processing unit and said memory management unit, said address translation unit including a page boundary cross detector, a micro translation look-aside buffer storing a subset of said plurality of address translations entries, and a virtual address to physical address translator, said address translation unit operable to translate memory accesses from said central processing unit from said first address domain to a second address domain by searching said micro translation look-aside buffer for a first address translation entry corresponding to a current first address;

if said first address translation entry is not stored in said micro translation look-aside buffer recalling said first address translation entry from said memory management unit, and storing said recalled first address translation entry in said micro translation look-aside buffer;

employing said a virtual address to physical address translator to translate said first address to a second address in a second domain according to said first address translation entry by substituting said second predetermined most significant bits of said second address domain for said first predetermined most significant bits of said first address domain of said address translation entry;

said address translation unit further operable to determine via said page boundary cross detector whether said first address corresponds to an address translation entry of a next memory page from a prior address, if said first address corresponds to an address translation entry of a next memory page, search said micro translation look-aside buffer for said next address translation entry, and if said next address translation entry is not stored in said micro translation look-aside buffer recall said next address translation entry from said memory management unit, and store said recalled next address translation entry in the micro translation look-aside buffer; and said micro translation look-aside buffer stores said recalled first address translation entry in a location corresponding to said first address, whereby said micro translation look-aside buffer may properly store an out-of-order recalled address translation entries.

* * * * *